United States Patent [19]
Kubo

[11] Patent Number: 5,757,509
[45] Date of Patent: May 26, 1998

[54] IMAGE FORMING MACHINE

[75] Inventor: Keiji Kubo, Osaka, Japan

[73] Assignee: Mita Industrial Co., Ltd., Osaka, Japan

[21] Appl. No.: 811,837

[22] Filed: Mar. 5, 1997

[30] Foreign Application Priority Data

Mar. 13, 1996 [JP] Japan ..................... 8-083051

[51] Int. Cl.$^6$ ................. B41J 29/38; G06F 3/12
[52] U.S. Cl. .................... 358/296; 358/401; 395/101
[58] Field of Search ..................... 358/296, 408, 358/407, 468; 395/101, 114

[56] References Cited

U.S. PATENT DOCUMENTS 4,630,921 12/1986 Watanabe .
5,325,209 6/1994 Manabe ..................... 358/437

FOREIGN PATENT DOCUMENTS 4133998 4/1993 Germany .

*Primary Examiner*—Peter S. Wong
*Assistant Examiner*—Gregory Toatley
*Attorney, Agent, or Firm*—Beveridge, DeGrandi, Weilacher & Young, LLP

[57] ABSTRACT

An image forming machine comprising a host computer, a printer, a copying machine, and a document supply device for conveying a document printed by the printer to an automatic document feeder of the copying machine includes a data switching controller which is connected to the host computer via a parallel data transfer type interface to selectively transfer data transmitted from the host computer to the printer side and to the copying machine side. The host computer sequentially puts out to the data switching controller a copying machine control code comprising an identification code with a predetermined number of bytes, and control data with a predetermined number of bytes succeeding the identification code, and print data for the printer subsequent to the copying machine control code.

2 Claims, 12 Drawing Sheets

IMAGE FORMING MACHINE

FIELD OF THE INVENTION

This invention relates to an image forming machine comprising a combination of a host computer capable of network connection, such as a computer, a word processor or an image editing device; a printer as an output device for the host computer; and a copying machine equipped with an automatic document feeder.

DESCRIPTION OF THE PRIOR ART

In recent years, a laser printer has found wide use as an output device for a computer, a word processor or an image editing device. A laser printer used as an output device for a word processor or the like gives a clear printed image, but its print speed is much lower than the print speed of a copying machine. If it is desired to obtain image information, produced by a word processor or the like, as a multiplicity of prints, it is customary practice to put out the image information from the word processor or the like by means of a laser printer, thereby preparing a document, and then make a necessary number of copies of this document by use of a high speed copying machine. This procedure is tiresome. As a solution to this problem, Japanese Utility Model Publication No. 2616/87, Japanese Laid-Open Patent Publication No. 176967/86 and Japanese Laid-Open Patent Publication No. 264581/92, for example, disclose image forming machines in each of which a printer and a copying machine are coupled together, image information produced by a word processor or the like is printed by the printer, the resulting printed document is conveyed onto a document-placing glass panel of the copying machine, and then a required number of copies of this document are made by the copying machine.

In such an image forming machine as a combined device, a host computer, such as a computer, a word processor or an image editing device, needs to issue a print command to the printer, and a control command on the copying conditions, etc. to the copying machine. Generally, the host computer and the printer are connected together via a parallel data transfer type interface capable of rapid data transfer, such as a Centronics interface. When data is transferred from the host computer to the printer so that the transferred print data and the data for control of the copying machine will be controlled on the printer side, device drivers, software on the parts of the host computer and the printer, will become complicated. This will make it difficult to mount a user-selected printer.

SUMMARY OF THE INVENTION

The object of the present invention is to provide an image forming machine as a combined device capable of using a general-purpose printer without applying specialized software for data processing to the printer.

To attain this object, the invention provides an image forming machine comprising a host computer; a printer for printing the output of the host computer; a copying machine for making a predetermined number of copies of a document which is a printed sheet printed by the printer, the copying machine being equipped with an automatic document feeder; and a document supply device for conveying the document printed by the printer to the automatic document feeder, wherein a data switching controller connected to the host computer via a parallel data transfer type interface is provided for selectively transferring data transmitted from the host computer to control means provided in the printer, and to control means provided in the copying machine, the host computer sequentially produces a copying machine control code comprising an identification code covering a predetermined number of bytes, and control data of a predetermined number of bytes succeeding the identification code, and print data for the printer subsequent to the copying machine control code, and the data switching controller transfers the control data with the predetermined number of bytes, sent after the identification code by the host computer, to the control means of the copying machine, and transfers the subsequent print data to the control means of the printer.

According to the present invention, there is also provided the image forming machine in which the data switching controller is composed of a bidirectional data selector for switching the parallel data transfer type interface side to the control means side of the copying machine or the control means side of the printer, and a processing unit for switch-controlling the bidirectional data selector according to the number of bytes of the data transmitted from the host computer.

DETAILED DESCRIPTION OF THE PREFERRED EMBODIMENTS

The present invention will now be described in more detail by reference to the accompanying drawings which illustrate preferred embodiments of an image forming machine constructed in accordance with the present invention.

Figure 1:
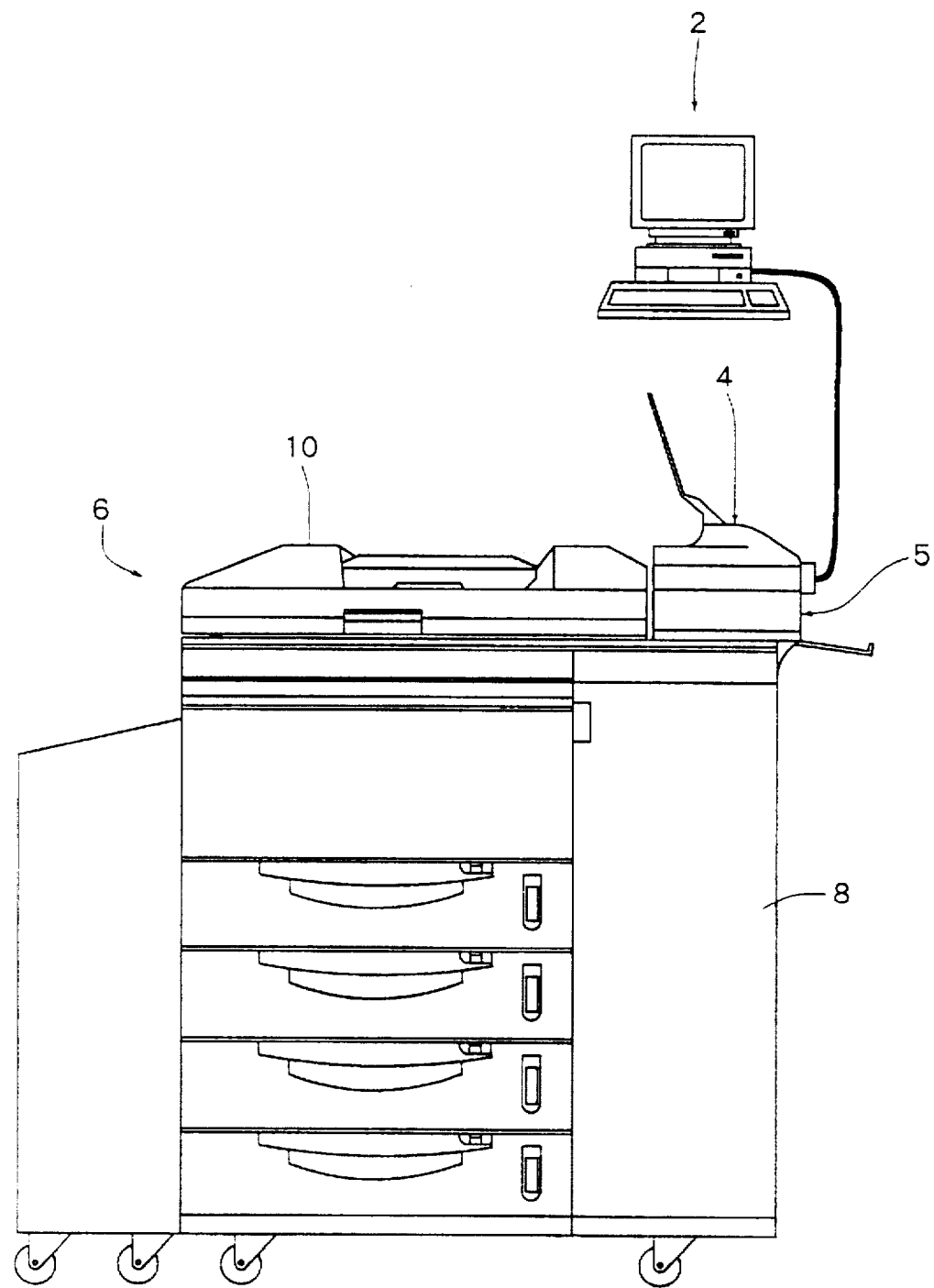
FIG. 1 is a schematic structural view of an image forming machine constructed in accordance with the present invention.

FIG. 1 shows an image forming machine constructed in accordance with the invention. The illustrated image forming machine comprises a host computer 2, a printer 4 for printing the output of the host computer 2, a copying machine 6 for making a predetermined number of copies of a document which is a printed sheet printed by the printer 4, and a document supply device 5 for conveying the document printed by the printer to the copying machine 6.

The host computer 2 may be, for example, a personal computer, a word processor, or an image editing device for editing graphics on a CRT display. The host computer 2 produces control data for the copying machine, and print data for the printer. The manner of transmission and transfer of these control data and print data will be described in detail later.

Figure 2:
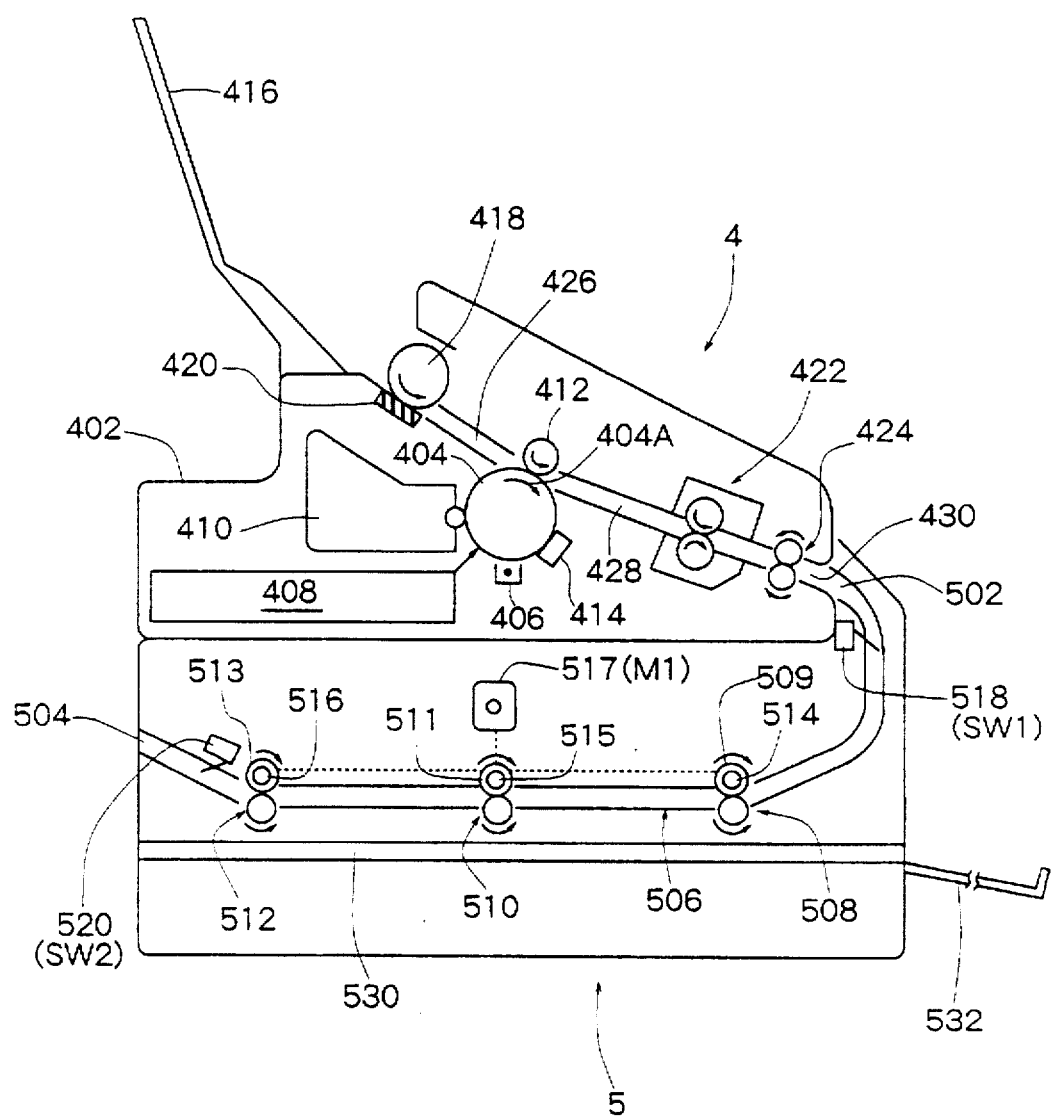
FIG. 2 is a schematic structural view of a printer and a document supply device which constitute the image forming machine shown in FIG. 1.

In the illustrated embodiment, the printer 4 is a small low-speed laser printer to be used as a printing device for a word processor or the like. The printer 4, as shown in FIG. 2, has a photoconductor drum 404 disposed nearly in the center of a housing 402 and having a photosensitive layer on the peripheral surface thereof. The photoconductor drum 404 is rotationally driven by drive means (not shown) in a direction shown by an arrow 404A. Around the photoconductor drum 404, a charging corona discharger 406, a laser unit 408, a developing device 410, a non-contact transfer roller 412, and a paper dust removal brush 414 are disposed in this order in the direction of rotation indicated by the arrow 404A. The printer 4 also has a sheet feed tray 416 for placing a transfer sheet. Downstream from this sheet feed tray 416, a sheet feed roller 418 is disposed, and a friction pad 420 for sheet separation is disposed at a position opposed to the sheet feed roller 418. Downstream from the photoconductor drum 404 and the transfer roller 412, a fixing roller pair 422 is disposed, and a discharge roller pair 424 is disposed downstream from the fixing roller pair 422. These rollers are rotationally driven in the directions of arrows by drive means (not shown). In the thus constructed printer 4, the photoconductor drum 404 is rotationally driven in the direction of the arrow 404A by drive means (not shown) in accordance with a print command from the host computer 2 to be described later. During this rotational driving, the photosensitive layer on the surface of the photoconductor drum 404 is charged substantially uniformly to a specific polarity by the charging corona discharger 406. The charged surface of the photosensitive layer of the photoconductor drum 404 is illuminated with a laser beam based on print data from the host computer 2 by the laser unit 408 to form a latent electrostatic image. The latent electrostatic image formed on the surface of the photosensitive layer of the photoconductor drum 404 is developed to a toner image by the developing device 410. Transfer sheets laid on the sheet feed tray 416 are fed one by one under the action of the sheet feed roller 418 and friction pad 420. The fed transfer sheet is conveyed through a guide path 426 into the gap between the photoconductor drum 404 and the transfer roller 412, whereby the toner image adhering to the photoconductor drum 404 is transferred onto its surface. The transfer sheet having the so transferred toner image is conveyed through a guide path 428 to the fixing roller pair 422. After the toner image is heat-fixed there, the transfer sheet having this fixed image is sent as a document by the discharge roller pair 424 from a discharge port 430 to the document supply device 5 to be described later.

The document supply device 5 is disposed at an upper surface on one side (the right side in FIG. 1) of the copying machine 6. The document supply device 5 has a send-in port 502 provided at a position opposed to the discharge port 430 of the printer 4, a discharge port 504 provided at a position opposed to a send-in port of an automatic document feeder of the copying machine 6 to be described later, and a document transport path 506 formed between the send-in port 502 and the discharge port 504. Along the document transport path 506, three document transport roller pairs 508, 510, 512 are disposed in the illustrated embodiment. Drive rollers 509, 511, 513 of the three document transport roller pairs 508, 510, 512, respectively, are transmissively connected to an electric motor 517 (M1) via a suitable power transmission mechanism so as to be rotationally driven in directions shown by arrows. In the illustrated embodiment, the drive rollers 509, 511, 513 of the document transport roller pairs 508, 510, 512, respectively, are transmissively connected to a power transmission mechanism (not shown) via one-way clutches 514, 515, 516, respectively. Between the send-in port 502 of the document transport path 506 and the upstream-side document transport roller pair 508, a document detector 518 (SW1) is disposed for detecting a document being sent from the discharge port 430 of the printer 4 into the document supply device 5. Between the discharge port 504 of the document transport path 506 and the downstream-side document transport roller pair 512, a document detector 520 (SW2) is disposed for detecting a document being supplied from the document supply device 5 to the automatic document feeder of the copying machine 6 to be described later. These document detectors 518 (SW1) and 520 (SW2) send their detection signals to control means of the copying machine 6 to be described later. The electric motor 517 (M1), the drive source for the document transport roller pairs 508, 510, 512, is adapted to have its rotational speed controlled by the control means of the copying machine 6 (to be described later) on the basis of detection signals from the document detectors 518 (SW1) and 520 (SW2). In the illustrated embodiment, a document return passageway 530 is provided below the document transport path 506. A document receiving tray 532 is disposed in connection with the exit of the document return passageway 530 at its right end in the drawing.

Next, the copying machine 6 will be described. The copying machine 6 has a copying machine body 8, and an automatic document feeder 10 disposed on the top of the copying machine body 8.

Figure 3:
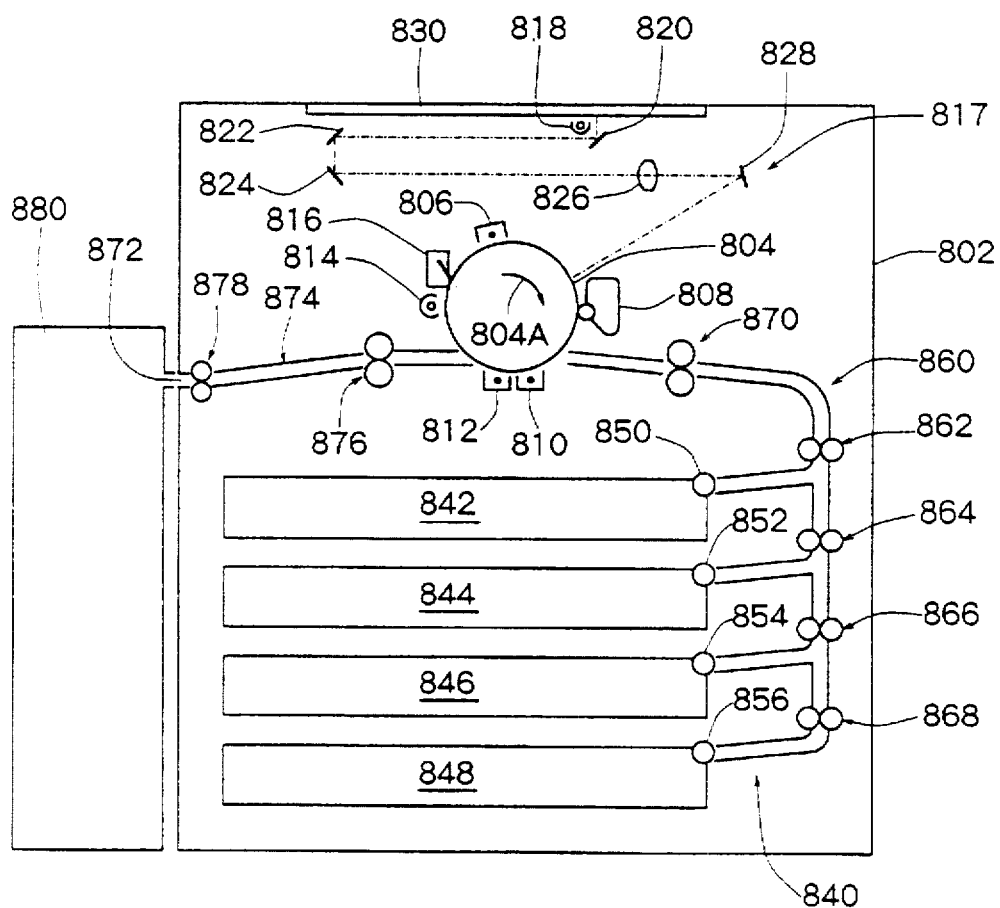
FIG. 3 is a schematic structural view of a copying machine body of a copying machine which constitutes the image forming machine shown in FIG. 1.

The copying machine body 8, as shown in FIG. 3, has a photoconductor drum 804 disposed nearly in the center of a housing 802 and having a photosensitive layer on the peripheral surface thereof. The photoconductor drum 804 is rotationally driven by drive means (not shown) in a direction shown by an arrow 804A. Around the photoconductor drum 804, a charging corona discharger 806, a developing device 808, a transfer corona discharger 810, a separating corona discharger 812, a static eliminator lamp 814, and a cleaning device 816 are disposed in this order in the direction of rotation indicated by the arrow 804A. The illustrated copying machine body 8 also includes an optical system 817 disposed above the photoconductor drum 804 and comprising an illumination lamp 818, a first mirror 820, a second mirror 822, a third mirror 824, a lens 826, and a fourth mirror 828. This optical system 817 is constructed such that a document placed on a transparent platen 830 disposed on the top of the housing 802 is illuminated by the illumination lamp 818, and a reflected-light image is focused onto the photoconductor drum 804 via the first mirror 820, second mirror 822, third mirror 824, lens 826, and fourth mirror 828.

Below the photoconductor drum 804, transfer sheet supply means 840 is disposed. The illustrated transfer sheet supply means 840 includes four transfer sheet cassettes 842, 844, 846, 848. These transfer sheet cassettes 842, 844, 846, 848 accommodate transfer sheets of sizes different from each other. At upper parts of the front ends (the right-side ends in FIG. 3) of the transfer sheet cassettes 842, 844, 846, 848, transfer sheet delivery rollers 850, 852, 854, 856, respectively, are disposed for sending out the transfer sheets accommodated in the corresponding cassettes. The transfer sheets sent off by the transfer sheet delivery rollers 850, 852, 854, 856 are conveyed to a transfer sheet feeding channel 860. Along the transfer sheet feeding channel 860, transport roller pairs 862, 864, 866, 868 are disposed. A resist roller pair 870 is disposed downstream of these transport roller pairs and upstream of a transfer zone where the transfer corona discharger 810 is disposed. A transfer sheet transport channel 874 is formed between a separation zone, where the separating corona discharger 812 is disposed, and a transfer sheet discharge port 872 provided in the housing 802. Along the transfer sheet transport channel 874, a fixing roller pair 876 and a discharge roller pair 878 are disposed. These roller pairs are rotationally driven by drive means (not shown).

The copying machine body 8 constructed as above works in the following manner: The photoconductor drum 804 is rotationally driven in the direction of an arrow 804A by drive means (not shown). During this motion, the photosensitive layer of the photoconductor drum 804 is charged to a specific polarity by the charging corona discharger 806 disposed in a charging zone. The photosensitive layer of the photoconductor drum 804, charged to the specific polarity by the charging corona discharger 806, is scan-exposed by the optical system 817 to the image of a document placed on the transparent platen 830, thereby forming a latent electrostatic image. The latent electrostatic image formed in the photosensitive layer of the photoconductor drum 804 is developed to a toner image by the developing device 808. The toner image so formed in the photosensitive layer of the photoconductor drum 804 is transferred by the action of the transfer corona discharger 810 onto the surface of a transfer sheet conveyed to the transfer zone by the transfer sheet supply means 840. The transfer sheet having the transferred toner image is separated from the photoconductor drum 804 by the action of the separating corona discharger 812, and is then conveyed to the fixing roller pair 876, where the toner image is heat-fixed. The transfer sheet having the toner image transferred and heat-fixed in this manner is discharged by the discharge roller pair 878 from the transfer sheet discharge port 872 to a sorter 880. The photosensitive layer of the photoconductor drum 804 having passed the transfer zone and the separation zone, on the other hand, is statically eliminated by the static eliminator lamp 814, and is further cleaned of remaining toner by the cleaning device 816.

In the illustrated embodiment, an electrostatic copying machine has been exemplified as the copying machine 6, but other type of copying machine may be used. For example, there may be used a copying machine with such a printing function that a latent electrostatic image formed on the surface of a photoconductor drum is developed to form a toner image, this toner image is fixed onto the surface of the photoconductor drum to form a print master, and the print master is used to transfer a developed image onto a predetermined sheet.

Next, the automatic document feeder 10 will be described with reference to FIG. 4. A document restraining member 832 is disposed on one side of the transparent platen 830 (the left side in FIG. 4) disposed on the top of the copying machine body 8. On the other side of the transparent platen 830 (the right side in FIG. 4), a stationary mounting member 834 is disposed. The document restraining member 832 is mounted so as to be pivotable between an operating position indicated by a solid line in FIG. 4 and a descent position indicated by a two-dot chain line in FIG. 4. When the document restraining member 832 is located at the operating position, its front end (the right edge in FIG. 4) is protruded slightly above the top of the transparent platen 830. When the document restraining member 832 is located at the descent position, its front end is lowered below the top of the transparent platen 830. The document restraining member 832 is adapted to be actuated by a solenoid 836 (SOL1). When the solenoid 836 (SOL1) is deenergized, the document restraining member 832 is located at the operating position. When the solenoid Ad 836 (SOL1) is energized, the document restraining member 832 is brought to the descent position.

The automatic document feeder 10 is mounted on the top of the housing 802 of the copying machine body 8 so as to be pivotable about a pivot axis extending along the rear side edge of the transparent platen 830. When a document is to be placed manually on the transparent platen 830 of the copying machine body 8, the automatic document feeder 10 is pivoted upward from the illustrated closed position to an open position to expose the transparent platen 830 to the outside. Then, the document is placed at a required position on the transparent platen 830, and the automatic document feeder 10 is brought to the illustrated closed position to cover the transparent platen 830 and the document placed thereon. In laying the document on the transparent platen 830, one can set the document at the required position by bringing one edge of the document into contact with the front edge of the document restraining member 832 located at the operating position. When the automatic document feeder 10 is used to send the document automatically onto the transparent platen 830 and send it out automatically from there, the automatic document feeder 10 is used in a condition in which it is put to the closed position.

Figure 4:
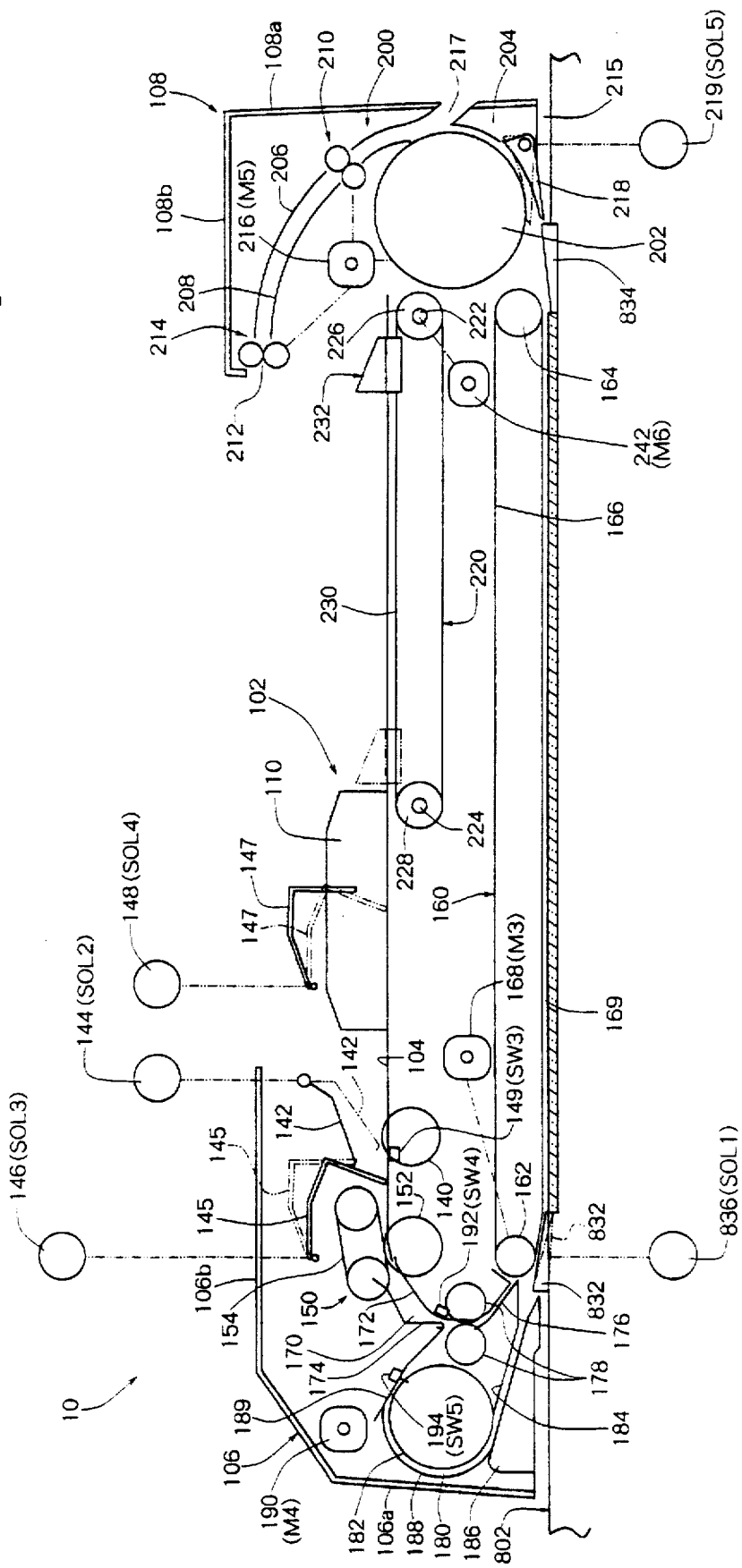
FIG. 4 is a sectional view of an automatic document feeder provided in the copying machine which constitutes the image forming machine shown in FIG. 1.

Further with reference to FIG. 4, the illustrated automatic document feeder 10 includes document stand means 102 disposed between a front side cover and a rear side cover (not shown) disposed with spacing in a back-and-forth direction (the direction perpendicular to the sheet face in FIG. 4). This document stand means 102 is defined by a stationary plate 104 of a plastic material extending substantially horizontally. A left end portion cover 106 is disposed between left end portions of the front side cover and the rear side cover, while a right end portion cover 108 is disposed between right end portions of the front and rear side covers. The left end portion cover 106 has a left end wall portion 106a covering the left end surface of the automatic document feeder 10, and a top panel wall portion 106b extending above a downstream portion of the document stand means 102. The right end portion cover 108 has a right end wall portion 108a covering the right end surface of the automatic document feeder 10, and a top panel wall portion 108b extending leftward from the upper end of the right end wall portion 108a.

Figure 5:
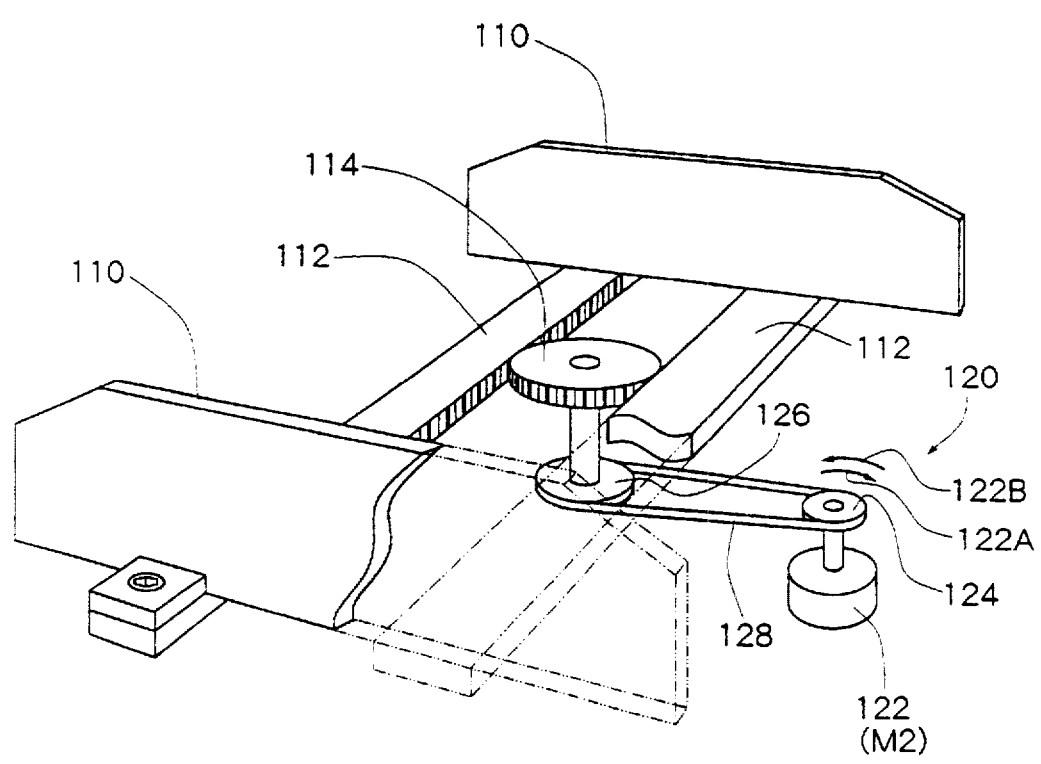
FIG. 5 is a perspective view showing a width regulating cursor and cursor actuating means which constitute document stand means provided in the automatic document feeder shown in FIG. 4.

The document stand means 102 has a pair of width regulating cursors 110, 110 mounted in the center of the stationary plate 104 so as to be movable widthwise. The pair of width regulating cursors 110, 110 are coupled to racks 112, 112 below the stationary plate 104 as shown in FIG. 5. The racks 112, 112 each engage a pinion 114, so that the pair of width regulating cursors 110, 110 mounted on the racks 112, 112 are moved toward and away from each other in an interlocked manner. In the illustrated embodiment, cursor actuating means 120 is provided for actuating the pair of width regulating cursors 110, 110. The cursor actuating means 120 comprises an electric motor 122 (M2) such as a pulse motor, a toothed drive pulley 124 mounted on the output shaft of the electric motor 122 (M2), and a timing belt 128 wound between the toothed drive pulley 124 and a toothed drive pulley 126 mounted on a shaft to which the pinion 114 has been attached. In the so constructed cursor actuating means 120, when the electric motor 122 (M2) is rotationally driven in a direction of an arrow 122A, the pair of width regulating cursors 110, 110 are moved toward each other. When the electric motor 122 (M2) is rotationally driven in a direction of an arrow 122B, the pair of width regulating cursors 110, 110 are moved away from each other. When the electric motor 122 (M2) has been deenergized, the pair of width regulating cursors 110, 110 can be moved manually.

Downstream from the pair of width regulating cursors 110, 110, an opening is formed in the stationary plate 104, and a rotatably disposed feed roller 140 is protruded upward from the opening. As shown in FIG. 4, a press member 142 is disposed above the stationary plate 104 in association with the feed roller 140. The press member 142 is adapted to be actuated by a solenoid 144 (SOL2). When the solenoid 144 (SOL2) is deenergized, the press member 142 is located at an ascent position indicated by a solid line in FIG. 4. When the solenoid 144 (SOL2) is energized, on the other hand, the press member 142 is resiliently urged counterclockwise in FIG. 4 to press a document placed on the stationary plate 104 against the feed roller 140. Downstream from the press member 142, a document setting stopper 145 is disposed above the stationary plate 104. The document setting stopper 145 is adapted to be actuated by a solenoid 146 (SOL3). When the solenoid 146 (SOL3) is deenergized, the document setting stopper 145 is located at a stop position indicated by a solid line in FIG. 4. When the solenoid 146 (SOL3) is energized, on the other hand, the document setting stopper 145 is brought to a retreat position indicated by a two-dot chain line in FIG. 4. Upstream from the press member 142, a discharged document front end position regulating member 147 is also disposed above the stationary plate 104. The discharged document front end position regulating member 147 is adapted to be actuated by a solenoid 148 (SOL4). When the solenoid 148 (SOL4) is deenergized, the discharged document front end position regulating member 147 is located at a retreat position indicated by a solid line in FIG. 4. When the solenoid 148 (SOL4) is energized, on the other hand, the discharged document front end position regulating member 147 is brought to a regulating position indicated by a two-dot chain line in FIG. 4. The so constructed press member 142, document setting stopper 145, and discharged document front end position regulating member 147 are actuated in the following manner according to the state of operation of the automatic document feeder 10. When a document is to be set on the stationary plate 104, the document setting stopper 145 is brought to the stop position, and the press member 142 and the discharged document front end position regulating member 147 are put to the ascent position and the retreat position, respectively. When the document is set on the stationary plate 104 and a copy action is started, the document setting stopper 145 is brought to the retreat position, and the press member 142 presses the document placed on the stationary plate 142. Simultaneously, the discharged document front end position regulating member 147 is located at the regulating position. Between the document setting stopper 145 and the discharged document front end position regulating member 147 placed on the stationary plate 104, a hole is provided. Below this hole, a reflection-type document detector 149 (SW3) is disposed for detecting whether or not a document is placed on the stationary plate 104 of the document stand means 102.

Downstream from the feed roller 140, document separating means 150 is disposed. The document separating means 150 is composed of a separating roller 152 protruding upwardly through a notch formed in the stationary plate 104, and a separating belt mechanism 154 disposed opposite and above the separating roller 152. The separating roller 152 is rotationally driven counterclockwise in FIG. 4, while the separating belt mechanism 154 is rotationally driven counterclockwise in FIG. 4 via a one-way rotating clutch (not shown). The so constructed document separating means 150 prevents the feed of two or more documents from a stack of documents placed on the document stand means 102, and conveys only the bottom-most document.

Further referring to FIG. 4, a conveyor belt mechanism 160 is disposed below the document stand means 102. The conveyor belt mechanism 160 constituting conveying means includes a drive roller 162 and a driven roller 164 disposed with spacing in the conveying direction (the right-and-left direction in FIG. 4), and an endless belt 166 looped over these rollers. The drive roller 162 is rotationally driven by an electric motor 168 (M3). A lower travel portion of the endless belt 166 extends along the transparent platen 830 of the copying machine body 8, and a document transport path 169 is defined between this lower travel portion and the transparent platen 830. Between the document transport path 169 and the document stand means 102, a document send-in path 170 is formed. The document send-in path 170 is defined between an inner guide plate 172 and outer guide plates 174, 176. Beside the document send-in path 170, a send-in roller pair 178 is disposed which, together with the feed roller 140 and the document separating means 150, constitutes document send-in means for sending the document on the document stand means 102 into the document transport path 169 through the document send-in path 170. In the illustrated embodiment, a document inversion path 180 for inverting the face and back of the document sent into the document transport path 169 is provided on the left side of the document send-in path 170. The document inversion path 180 is defined between an inversion roller 182, which is rotationally driven clockwise in FIG. 4, and an inner guide plate 184 and outer guide plates 186, 188 and 189. The feed roller 140, document separating means 150, send-in roller pair 178, and inversion roller 182 are transmissively connected to an electric motor 190 (M4) via a power transmission mechanism (not shown). Immediately upstream of the send-in roller pair 178 beside the document send-in path 170 and on the document inversion path 180, a document detector 192 (SW4) and a document detector 194 (SW5) are disposed, respectively.

On the right of the document transport path 169, a document send-out path 200 is formed. The document send-out path 200 is defined between a sendout roller 202, which is rotationally driven counterclockwise in FIG. 4, and outer guide plates 204, 206 and an inner guide plate 208. At an intermediate portion of the document send-out path 200, a transport roller pair 210 is disposed. At the downstream end of the document send-out path 200, a document discharge port 212 is formed. Immediately upstream of the document discharge port 212, a document discharge roller pair 214 is disposed. The send-out roller 202, transport roller pair 210 and document discharge roller pair 214 are adapted to be rotationally driven by an electric motor 216 (M5). Upstream of the transport roller pair 210 in the document send-out path 200, a document send-in port 217 is provided. The document send-in port 217 is formed to be opposed to the discharge port 504 of the document supply device 5. Thus, the document that has been printed by the printer 4, conveyed by the document supply device 5, and discharged from the discharge port 504 is sent into the document send-out path 200 from the document send-in port 217. By the action of the transport roller pair 210 and document discharge roller pair 214, the document is then discharged onto the stationary plate 104 of the document stand means 102 of the automatic document feeder 10. On the entrance side of the document send-out path 200, a switching control plate 218 is disposed. The switching control plate 218 is adapted to be actuated by a solenoid 219 (SOL5). When the solenoid 219 (SOL5) is deenergized, the switching control plate 218 is located at a first position indicated by a solid line in FIG. 4. When the solenoid 219 (SOL5) is energized, the switching control plate 218 is located at a second position indicated by a two-dot chain line in FIG. 4. Thus, when the switching control plate 218 is brought to the first position, the document conveyed by the conveyor belt mechanism 160 is sent to the document send-out path 200. When the switching control plate 218 is brought to the second position, on the other hand, the document conveyed by the conveyor belt mechanism 160 is conveyed to the document receiving tray 532 through a bypass path 215 and the document return passageway 530 provided in the document supply device 5.

Figure 6:
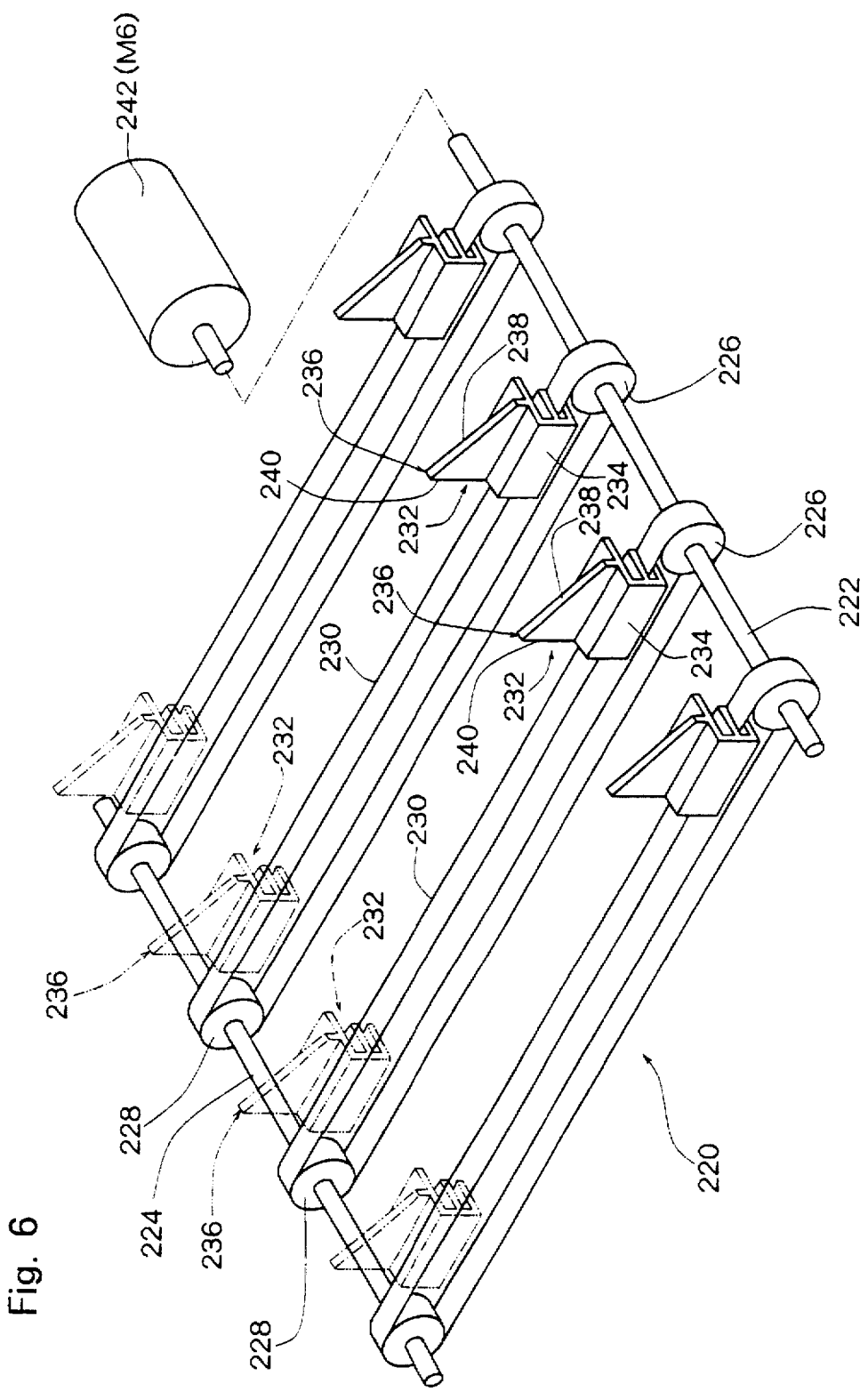
FIG. 6 is a perspective view showing a document moving mechanism provided in the automatic document feeder shown in FIG. 4.

The automatic document feeder 10 in the illustrated embodiment has a document moving mechanism 220 in association with the document discharge port 212. The document moving mechanism 220 is disposed below the document discharge port 212 and the stationary plate 104 disposed downstream therefrom. Referring to FIG. 6, the document moving mechanism 220 includes a drive shaft 222 and a driven shaft 224 mounted rotatably with spacing in the document conveying direction. To the drive shaft 222, four pulleys 226 are fixed with suitable spacing in the axial direction thereof. Likewise, four pulleys 228 are fixed to the driven shaft 224 with suitable spacing in the axial direction thereof. Over each pair of the pulleys 226 and 228, an endless belt 230 is wound. To the upper travel portion of each of the endless belts 230, a protruding member 232 is fixed. Each of the protruding members 232 has a base portion 234 fixed to the endless belt 230, and a protruding main portion 236 projecting upwards from the base portion 234. The upstream upper surface 238 of the protruding main portion 236 of each of the protruding members 232 is inclined upwards toward the downstream side at an angle of inclination of, say, about 45 degrees. On the downstream side of the protruding main portion 236 of each of the protruding members 232, there is formed a cliffed surface 240 which may be substantially vertical. The drive shaft 222 is transmissively connected to an electric motor 242 (M6) via a suitable power transmission mechanism. When rotationally driven, where necessary, in normal and reverse directions of rotation, the drive shaft 222 drives the endless belt 230, thereby moving the protruding member 232 in a suitable reciprocating manner between a receding position indicated by a solid line and a foremost advancing position indicated by a two-dot chain line in FIGS. 4 and 6 in accordance with the size of the document. The stationary plate 104 has four slits (not shown) extending in the conveying direction with spacing in the width direction (the direction perpendicular to the sheet face in FIG. 4) for permitting the reciprocating movement of the protruding members 232.

At the above-mentioned receding position, the protruding member 232 is positioned upstream of the document discharge port 212. When the protruding member 232 is caused to move forward from the receding position toward the downstream side, the protruding main portion 236 of the protruding member 232 is advanced while projecting upwards through the slit formed in the stationary plate 104. Thus, the protruding main portion 236 of the protruding member 232 acts on the rear edge of the stack of documents discharged through the document discharge port 212 and accumulated on the stationary plate 104 to advance the document stack downstream.

Figure 7:
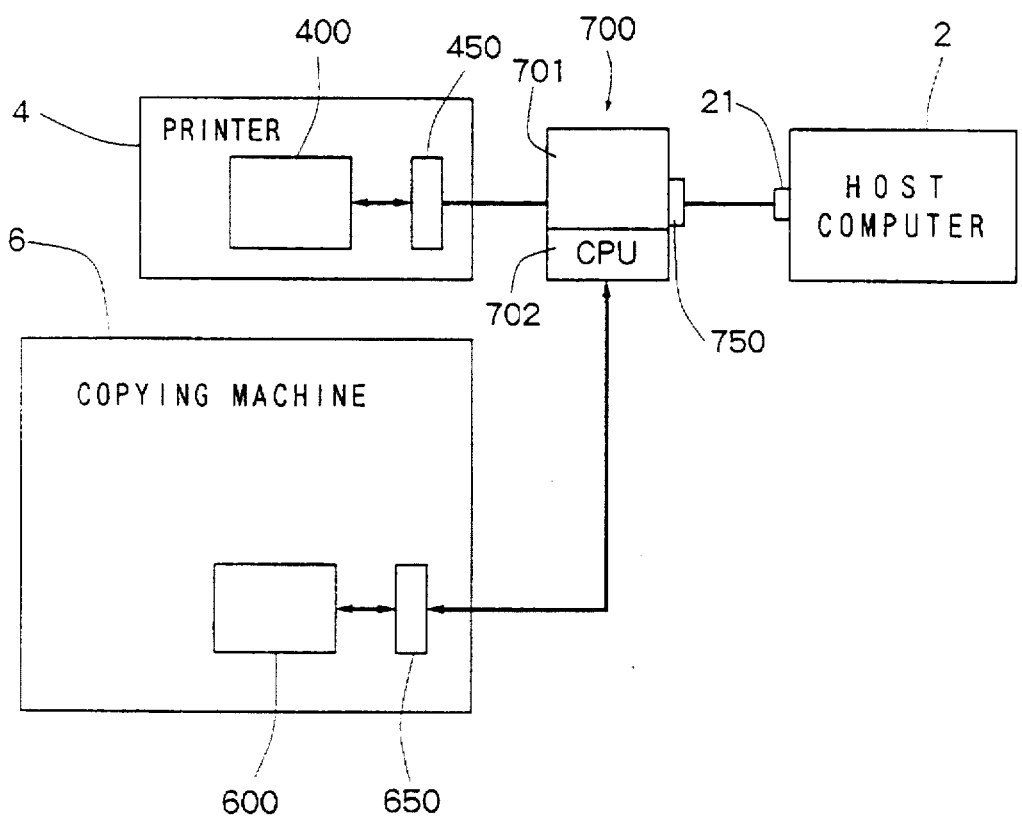
FIG. 7 is a block diagram showing the relation of connection of a host computer, the printer and the copying machine which constitute the image forming machine shown in FIG. 1.

Next, the manner of connection of the host computer 2 to the control means provided in the printer 4 and the copying machine 6 will be described by reference to FIG. 7. In the illustrated embodiment, there is a data switching controller 700 for selectively transferring data transmitted from the host computer 2 to control means 400 provided in the printer 4 and control means 600 provided in the copying machine 6. The data switching controller 700 comprises a bidirectional data selector 701 and a processing unit (CPU) 702. The bidirectional data selector 701 of the data switching controller 700 is connected to a parallel port 21 of the host computer 2 via a Centronics interface, a parallel data transfer type interface 750. The bidirectional data selector 701 is connected to the control means 400, provided in the printer 4, via a Centronics interface, a parallel data transfer type interface 450. The processing unit (CPU) 702 of the data switching controller 700, on the other hand, is connected to the control means 600, provided in the copying machine 6, via RS-232-C, a serial data transfer type interface 650. The processing unit (CPU) 702 controls the parallel data transfer type interface 750 to be switched to the control means 600 of the copying machine 6 or to the control means 400 of the printer 4. The interfaces 750 and 450 of the parallel data transfer type also incorporate a circuit wiring for transmitting to the host computer 2 a signal on the situation, such as a jam, in the printer 4 and the copying machine 6, or a print/copy mode acceptance authorization signal or the like from the copying machine 6.

Figure 8:
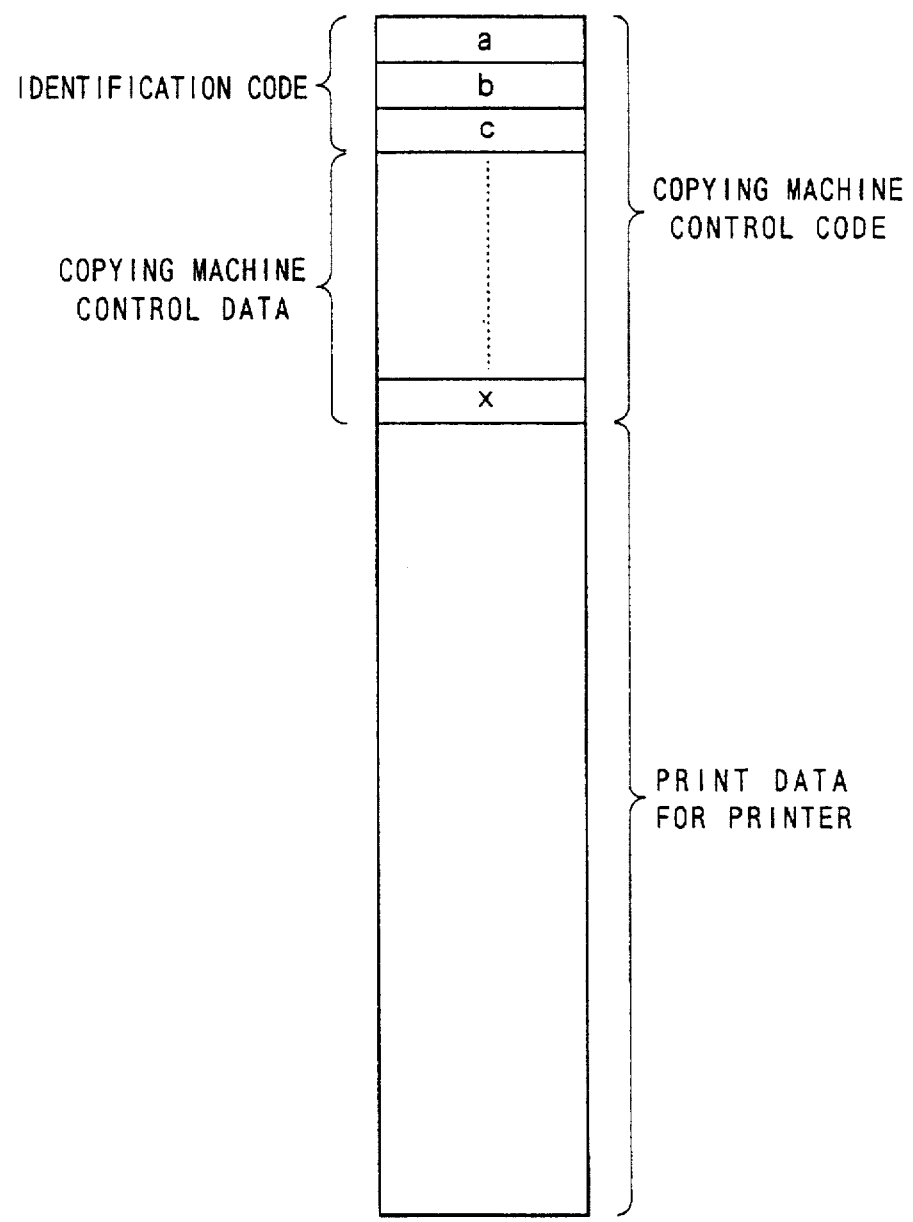
FIG. 8 is an explanatory view showing the order of transmission of a copying machine control code and print data from the host computer shown in FIG. 7.

An explanation will now be offered for the manner in which data is produced by the host computer 2, and the manner in which this output data is transferred to the control means 400 of the printer 4 and the control means 600 of the copying machine 6. When the host computer 2 executes "print" by input means such as a keyboard, the print driver starts, and a print/copy mode set screen appears on a display of a CRT or the like. Based on this print/copy mode set screen, control data on the copying conditions, such as the number of documents, the size of the document, the number of copies, variable magnification, and the amount of exposure, are set. Upon setting of the copying conditions this way, "set completion" is executed, whereupon the host computer 2 sequentially delivers data, shown in FIG. 8, from the parallel port 21 to the bidirectional data selector 701 of the data switching controller 700 via the Centronics interface, the parallel data transfer type interface 750. The data produced by the host computer 2 is divided into a copying machine control code and print data for the printer as shown in FIG. 8. The copying machine control code is divided into an identification code and copying machine control data in which the first seven bytes are set as the identification code, and the length from the 8th byte to the 255th byte is set as the copying machine control data involving the copying conditions. After putting out the thus set identification code and copying machine control data, the host computer 2 produces print data processed into data adapted to the printer 4. The data so transmitted from the host computer 2 are transferred by the processing unit (CPU) 702 of the data switching controller 700 to the control means 400 of the printer 4 and the control means 600 of the copying machine 6. That is, the processing unit (CPU) 702 transfers only the copying machine control data (ranging from the 8th byte to the 255th byte), succeeding the identification code (from the 1st to the 7th bytes), to the control means 600 of the copying machine 6 through the processing unit (CPU) 702. Then, while performing switchover of the bidirectional data selector 701, beginning with the 256th byte, the processing unit (CPU) 702 directly sends the print data (from the 256th byte) to the control means 400 of the printer 4. In the illustrated embodiment, the data switching controller 700 is thus provided for selecting the data transmitted from the host computer 2 via the parallel data transfer-style interface 750. The data switching controller 700 transfers the copying machine control data to the control means 600 of the copying machine 6, and directly sends the print data to the control means 400 of the printer 4. This eliminates the need to provide the printer 4 with a special device driver for data processing. Thus, a user can freely select a general-purpose printer. In the illustrated embodiment, moreover, the data transmitted from the host computer 2 is distinguished into the copying machine control code covering the predetermined number of bytes, and the succeeding print data for the printer. Thus, the data switching controller 700 that chooses between the copying machine control code and the print data is simple in construction and low in price.

Figure 9:
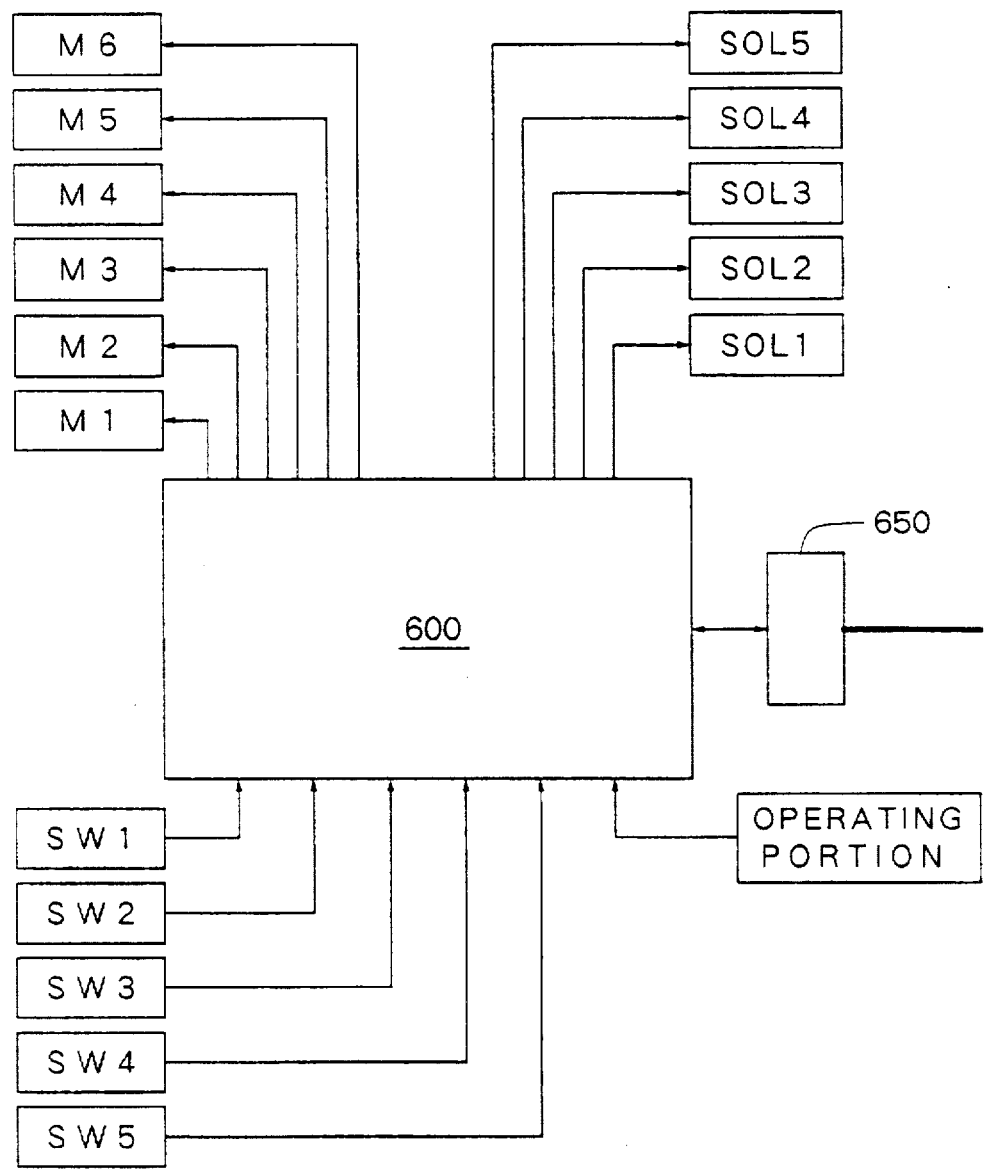
FIG. 9 is a block diagram showing control means of the copying machine shown in FIG. 7.
Figure 10:
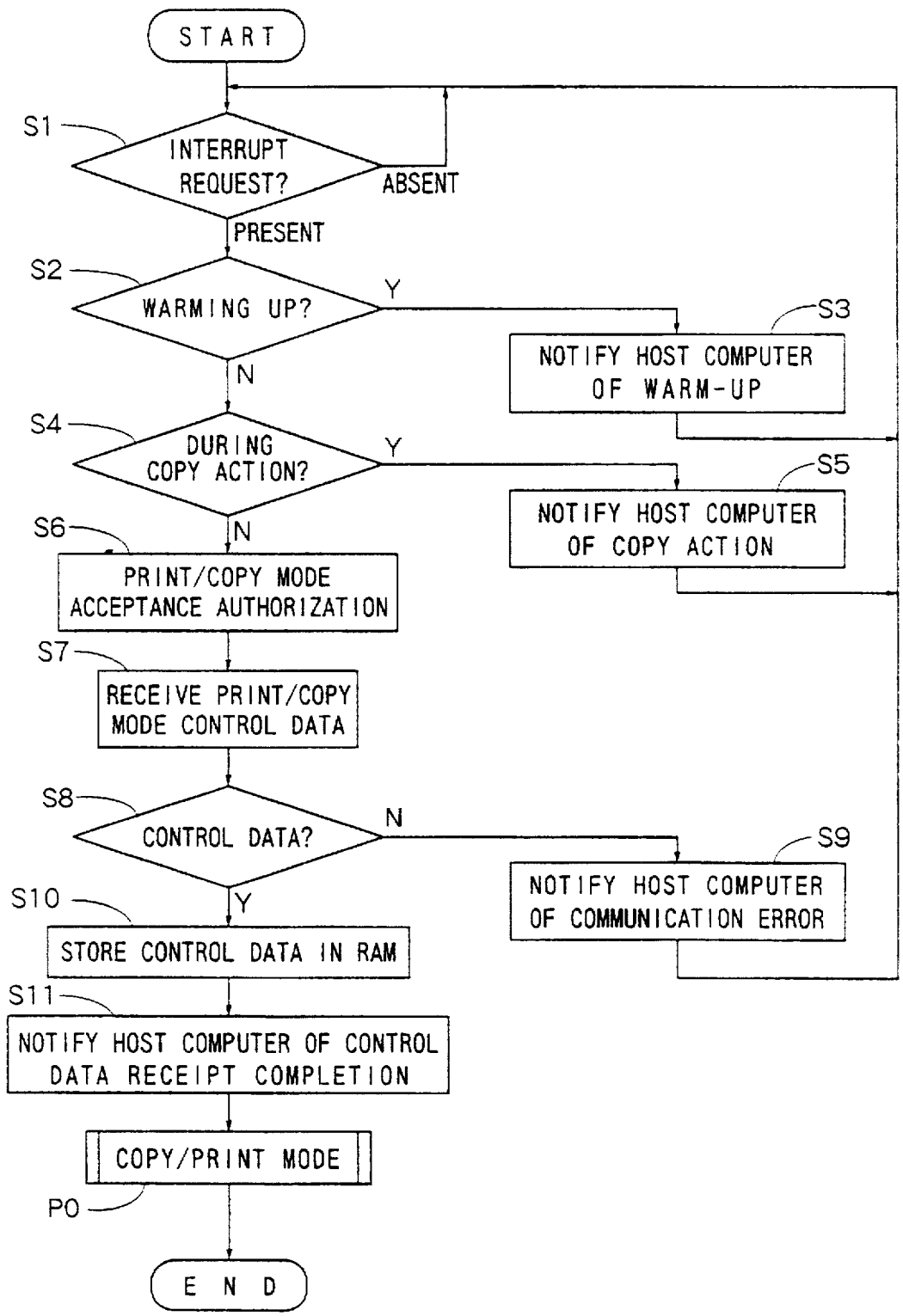
FIG. 10 is a flow chart showing a main routine for the operating procedure of the control means of the copying machine shown in FIG. 7.
Figure 11:
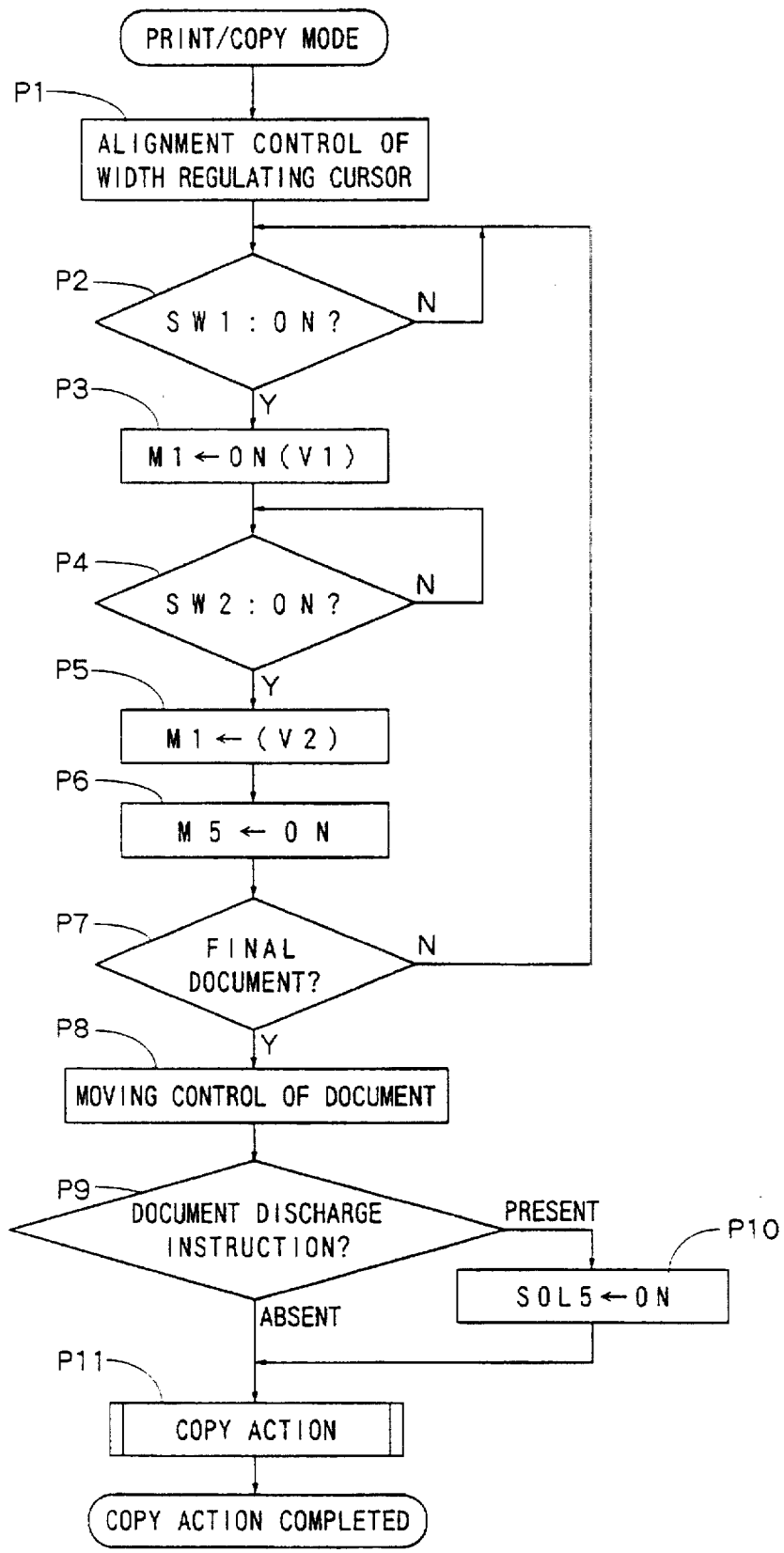
FIG. 11 is a flow chart showing an embodiment of the print/copy mode of the operating procedure of the control means of the copying machine shown in FIG. 7.
Figure 12:
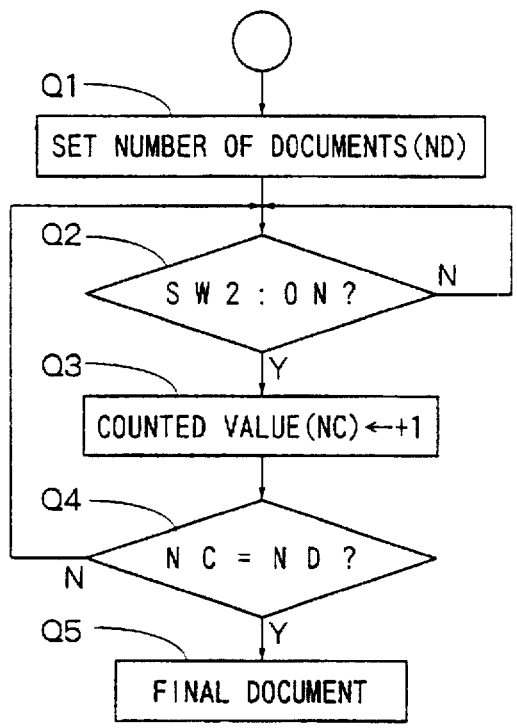
FIG. 12 is a flow chart showing an embodiment of the final document determination procedure of the control means of the copying machine shown in FIG. 7.

The control means 600 of the copying machine 6 will now be described with reference to FIG. 9. The control means 600 is constituted by a microcomputer, and has a central processing unit (CPU) for performing operations according to a control program, a read-only memory (ROM) for storing the control program, a random access memory (RAM) for storing the results of operations and being capable of reading and writing, a timer (T), and a counter (C). The so constituted control means 600 receives signals from the document detectors 518 (SW1) and 520 (SW2) disposed in the document supply device 5; the document detector 149 (SW3) for detecting whether or not the document is placed on the stationary plate 104 of the document stand means 102; the document detectors 192 (SW4) and 194 (SW5) disposed on the document send-in path 170 and the document inversion path 180, respectively; and an operating portion disposed on the top of the copying machine 6; as well as control signals from the host computer 2. Based on these input signals, the control means 600 puts out control signals to the electric motors 517 (M1), 122 (M2), 168 (M3), 190 (M4), 216 (M5) and 242 (M6), and the solenoids 836 (SOL1), 144 (SOL2), 146 (SOL3), 148 (SOL4) and 219 (SOL5).

The image forming machine in the illustrated embodiment is constructed as above. Its actions will be described with reference to flow charts shown in FIGS. 10 to 13.

The description will be made of cases in which edit work is completed in the host computer 2, the edited image is printed by the printer 4, and the print as a document is copied as a predetermined number of copies by the copying machine 6. When the host computer 2 executes "print" by input means such as a keyboard, the print driver starts, and a print/copy mode set screen appears on a display of a CRT or the like. Based on this print/copy mode set screen, control data on the copying conditions, such as the number of documents, the size of the document, the number of copies, variable magnification, and the amount of exposure, are set. Upon setting of the copying conditions, "set completion" is executed, whereupon the host computer 2 requests print/copy. This print/copy request results in an interrupt request made to the control means 600 of the copying machine 6 via the controller 700. The actions of the control means 600 of the copying machine 6 that has received the interrupt request for print/copy from the host computer 2 will be described on the basis of FIG. 10.

The control means 600 checks the print/copy interrupt request from the host computer 2 (step S1). When the interrupt request has existed, it goes to step S2 to check whether the copying machine 6 is warming up or not. A judgment of the warm-up is made by determination of whether the fixing roller pair 876 has reached a predetermined temperature. When the copying machine 6 is in the warm-up, the control means 600 proceeds to step S3 to notify the host computer 2 of the warm-up. If the copying machine 6 is not under warm-up at step S2, the control means 600 goes to step S4 to check whether the copying machine 6 is in a copy action. When the copying machine 6 is doing a copy action, the control means 600 goes to step S5 to notify the host computer 2 of the copy action. If the copying machine 6 is doing no copy action, the control means 600 proceeds to step S6, sending a print/copy mode acceptance authorization signal to the host computer 2. Then, the control means 600 goes to step S7, receiving print/copy mode control data from the host computer 2. At this moment, the host computer 2 sequentially delivers the data shown in FIG. 8 to the data switching controller 700. The data switching controller 700 transfers the copying machine control data, covering the predetermined number of bytes (up to the 255th byte) sent following the identification code with the predetermined number of bytes (from the 1st to the 7th bytes) in the data transmitted from the host computer 2, to the control means 600 of the copying machine 6, and also directly sends the print data (from the 256th byte) following the copying machine control data to the control means 400 of the printer 4. After receiving the control data in the print/copy mode from the host computer 2 at step S7, the control means 600 goes to step S8 to make sure that the received data is control data. If the received data is print data or the like, rather than control data, the control means 600 proceeds to step S9 to notify the host computer 2 of a communication error. When the data received from the host computer 2 at step S8 is control data, the control means 600 goes to step S10, storing the received control data into the built-in random access memory (RAM). Then, the control means 600 proceeds to step S11, notifying the host computer 2 that the receipt of control data has been completed. The control means 600 further proceeds to step P0 to execute an action in the copy/print mode.

The control means 600 of the copying machine 6 that has moved into the print/copy mode executes at step P1 the alignment control of the pair of width regulating cursors 110, 110 in the document stand means 102. This alignment control is performed by actuating the electric motor 122 (M2) comprising a pulse motor, the drive source of the cursor actuating means 120, on the basis of a document size signal received from the host computer 2 at step S7. That is, the electric motor 122 (M2) is rotationally driven in the direction of arrow 122B to separate the pair of width regulating cursors 110, 110 maximally from each other.

Then, predetermined pulses corresponding to the size of the document are given to the electric motor 122 (M2) for its rotational driving in the direction of arrow 122A, whereby the pair of width regulating cursors 110, 110 are positioned at predetermined positions corresponding to the document size. At this moment, print data is transferred from the host computer 2 to the printer 4, which starts a print action on the basis of the transferred print data. Then, the control means 600 moves to step P2, checking whether the document detector 518 (SW1) disposed in the document supply device 5 is ON or not. If it is not ON, the control means 600 enters the wait state, since the document printed by the printer 4 has not reached the document detector 518 (SW1). When it is ON, it is decided that the document printed by the printer 4 has been sent into the document transport path 506 of the document supply device 5. The control means 600 goes to step P3 to drive the electric motor 517 (M1) of the document supply device 5. The rotational speed of the electric motor 517 (M1) at this moment is a rotational speed (V1) at which the peripheral speed (transport speed) of the document transport roller pairs 508, 510, 512 driven by the electric motor 517 (M1) is equal to the conveying speed of the document conveyed by the printer 4. When the electric motor 517 (M1) is driven at the rotational speed (V1), the control means 600 goes to step P4 to check whether the document detector 520 (SW2) is ON or not. If the document detector 520 (SW2) is not ON, the control means 600 enters the wait state, since the document sent into the document supply device 5 has not reached the document detector 520 (SW2). When it is ON, a decision is made that the document has reached the document detector 520 (SW2). The control means 600 proceeds to step P5 to change the rotational speed of the electric motor 517 (M1) to (V2). This rotational speed (V2) is set to be greater than the rotational speed (V1). This is because the conveying speed of the automatic document feeder 10 is much higher than the conveying speed of the document conveyed by the printer 4, thus arousing the necessity of minimizing the difference between the conveying speed of the document conveyed from the document supply device 5 to the automatic document feeder 10 and the conveying speed of the automatic document feeder 10. After changing the rotational speed of the electric motor 517 (M1) to (V2), the control means 600 goes to step P6 to drive the electric motor 216 (M5), the drive source for the send-out roller 202, etc. of the automatic document feeder 10. By driving the electric motors 517 (M1) and 216 (M5) in this manner, the document printed by the printer 4 and sent into the document supply device 5 is conveyed by the document transport roller pairs 508, 510, 512, and fed from the discharge port 504 into the document send-out path 200 through the document send-in port 217 of the automatic document feeder 10. The document sent into the document send-out path 200 is discharged onto the stationary plate 104 of the document stand means 102 of the automatic document feeder 10 by the action of the transport roller pair 210 and the document discharge roller pair 214. The conveying speed of the transport roller pair 210 and the document discharge roller pair 214 is higher than the conveying speed of the document transport roller pairs 508, 510, 512. However, the document transport roller pairs 508, 510, 512 are provided with the one-way clutches 514, 515, 516, respectively. Thus, the document transport roller pairs 508, 510, 512 are rotated by the conveyed document so that their conveying speed will agree with the conveying speed of the transport roller pair 210 and the document discharge roller pair 214, whereby the difference in speed between these two types of roller pairs is accommodated. When the document is thus discharged onto the stationary plate 104 of the document stand means 102, the pair of width regulating cursors 110, 110 have been aligned in response to the document size as done at step P1. Hence, the discharged document will not pass over the width regulating cursors.

After the document printed by the printer 4 is discharged onto the stationary plate 104 of the document stand means 102 by the action of the document transport roller pairs 508, 510, 512 of the document supply device 5 as well as the transport roller pair 210 and the document discharge roller pair 214 of the automatic document feeder 10, the control means 600 goes to step P7 to check whether the conveyed document is the last document or not. Determination means to decide whether it is the last document will be described in detail later. If, at step P7, it is found not to be the last document, the control means 600 moves to the step P2, and executes the steps P2 to P7 repeatedly. When the document has been regarded as the last document at step P7, the control means 600 goes to step P8 to move the document stack, discharged onto the stationary plate 104 of the document stand means 102, to the document setting portion. That is, the electric motor 242 (M6) of the document moving mechanism 220 is driven for a predetermined amount of normal rotation in correspondence with the size of the document, whereupon the protruding member 232 advances the document stack downstream. At this moment, the document setting stopper 145 is put to the stop position, and the press member 142 and the discharged document front end position regulating member 147 are located at the ascent position and the retreat position, respectively. Thus, the document stack advanced downstream by the document moving mechanism 220 has its front end in contact with the document setting stopper 145, and is thus set at a predetermined position. After the document stack discharged onto the stationary plate 104 of the document stand means 102 is set at the predetermined position in this manner, the electric motor 242 (M6) is driven for a predetermined amount of reverse rotation, whereby the protruding member 232 is brought to the receding position. When the moving control of the document stack by the document moving mechanism 220 is performed at step P8, the control means 600 goes to step P9 to check whether a document discharge instruction has been issued by the host computer 2. When the document discharge instruction has been issued, the control means 600 goes to step P10 to energize the solenoid 219 (SOL5) to bring the switching control plate 218 to the second position. Then, the control means 600 goes to step P11. If there is no document discharge instruction from the host computer 2 at step P9, the control means 600 proceeds to step P11 to carry out a copy action.

The copy action at step P11 is the same as a copy action which is performed using the automatic document feeder 10 in the copying machine put to actual use.

That is, the document setting stopper 145 is brought to the retreat position, the press member 142 presses the document laid on the stationary plate 104, and the discharged document front end position regulating member 147 is put to the regulating position. Further, the electric motor 190 (M4) is driven to actuate the feed roller 152 and the document separating means 150. The bottom-most document in the document stack placed on the document stand means 102 is thereby sent into the document send-in path 170. When a predetermined period of time has elapsed since the document detector 192 (SW4) detected the front end of the document so sent into the document send-in path 170, the electric motor 190 (M4) is stopped. As a result, the front end of the sent-in document is brought into contact with the nip site of the send-in roller pair 178 put in the nonoperating state. This causes a front part of the document to be curved, thereby correcting a slant of the document. Then, the electric motor 168 (M3) is driven for normal rotation, and the electric motor 190 (M4) is driven to further advance the document sent in as far as the send-in roller pair 178. Consequently, the document is delivered into the document transport path 169, and brought to a predetermined position on the transparent platen 830 of the copying machine body 8. When the document is thus positioned at the predetermined position on the transparent platen 830, the respective devices of the copying machine body 8 are actuated to perform a copy action for making the number of copies designated by the host computer 2. Transfer sheets that have been dispatched from the transfer sheet supply means 840 and have images transferred onto them are discharged sequentially onto predetermined stages of the sorter Upon completion of a copy action for the first document in the above-described manner, the electric motor 168 (M3) is driven for normal rotation, whereby the conveyor belt mechanism 160 is rotationally driven counterclockwise in FIG. 4. Furthermore, the electric motor 216 (M5) is driven to rotationally drive the send-out roller 202 and the transport roller pair 210. Thus, the document on the transparent platen 830 is conveyed from the document transport path 169 toward the document send-out path 200. When, at this moment, the switching control plate 218 is located at the second position, the document conveyed by the conveyor belt mechanism 160 is conveyed to the document receiving tray 532 through the bypass path 215 and the document return passageway 530 provided in the document supply device 5. When the switching control plate 218 is located at the first position, on the other hand, the document conveyed by the conveyor belt mechanism 160 is sent to the document send-out path 200, and discharged onto the stationary plate 104 of the document stand means 102 by the action of the send-out roller 202, transport roller pair 210 and document discharge roller pair 214. A copy action is completed by performing the above-described document send-in, copy and discharge actions for all the documents placed on the stationary plate 104 of the document stand means 102. If a clear key of the operating portion disposed on the top of the copying machine 6 is depressed during the copy action, the control means 600 ceases the copy action, and clears the copy mode.

Next, an explanation will be offered for determination means for judging whether the document at step P7 in the print/copy mode is the final document or not. First, cases in which the control data transferred from the host computer 2 to the control means 600 of the copying machine 6 designates the number of documents will be explained with reference to a flow chart shown in FIG. 12. The control means 600 of the copying machine 6 sets in the counter (C) the number of documents (ND) of the control data transferred from the host computer 2 (step Q1). After the number of documents (ND) is set at step Q1, the control means 600 starts counting with the counter (C), and goes to step Q2 to check whether the document detector 520 (SW2) disposed on the document transport path 506 of the document supply device 5 is ON or not, namely, whether the front end of the document printed by the printer 4 has reached the document detector 520 (SW2). If the document detector 520 (SW2) is not ON, the control means 600 enters the wait state. When it is ON, the control means 600 proceeds to step Q3, adding +1 to the counted value (NC). Then, the control means 600 proceeds to step Q4, checking whether the counted value (NC) has equaled the set number of documents (ND). If the counted value (NC) is not equal to the number of documents (ND), the control means 600 moves to the step Q2, repeating the steps Q2 to Q4. When the counted value (NC) is equal to the number of documents (ND) at step Q4, the control means 600 determines that the document is the final document (step Q5).

Figure 13:
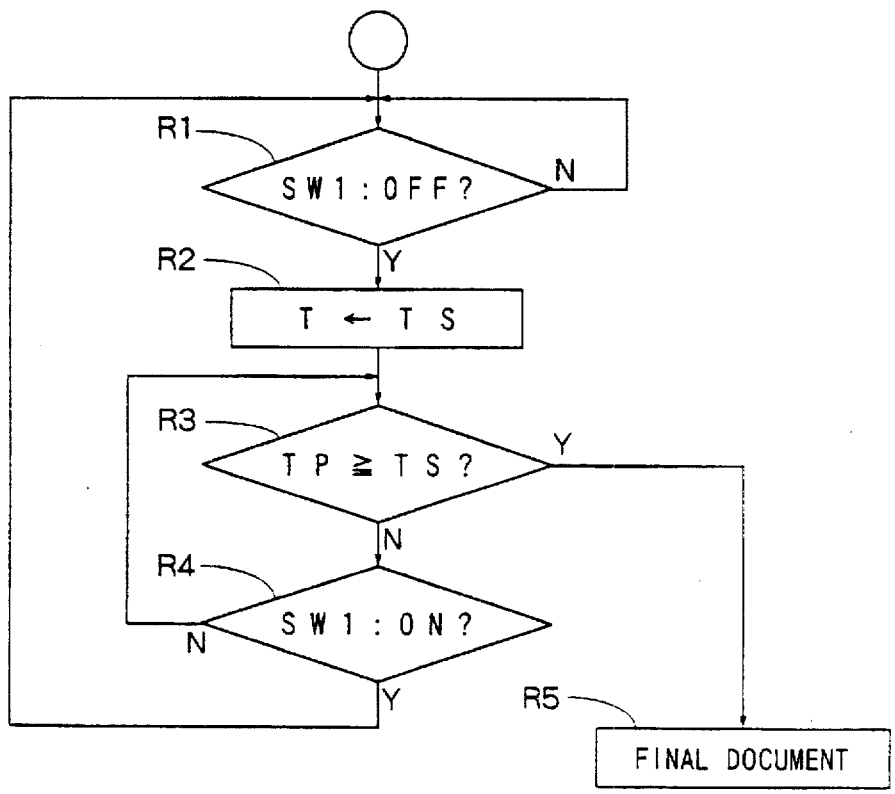
FIG. 13 is a flow chart showing another embodiment of the final document determination procedure of the control means of the copying machine shown in FIG. 7.

Next, determination means on the final document in cases where the number of documents has not been designated in data transferred from the host computer 2 to the control means 600 of the copying machine 6 will be explained with reference to a flow chart shown in FIG. 13. The control means 600 of the copying machine 6 checks at step R1 whether the document detector 518 (SW1) disposed on the document transport path 506 of the document supply device 5 is OFF or not, namely, whether the rear end of the document printed by the printer 4 has passed the document detector 518 (SW1). If the document detector 518 (SW1) is not OFF, the control means 600 enters the wait state. When the document detector 518 (SW1) is OFF, the control means 600 goes to step R2, setting the timer (T) at a predetermined time (TS). The set time (TS) is set in consideration of the print speed of the printer 4, and has been set, for example, at about twice the print timing relative to the next page. Then, the control means 600 proceeds to step R3 to check whether the elapsed time (TP) since the timer (T) was set at the predetermined time (TS) has reached the set time (TS) or not. If the elapsed time (TP) has not reached the set time (TS), the control means 600 proceeds to step R4 to check whether the document detector 518 (SW1) is ON or not. If the document detector 518 (SW1) is not ON at step R4, this means that the next document printed by the printer 4 has not reached the document detector 518 (SW1). In this case, the control means 600 returns to the step R3, executing the steps R3 and R4 again. When the document detector 518 (SW1) is ON at step R4, it is determined that the next document printed by the printer 4 has reached the document detector 518 (SW1). The control means 600 moves to the step R1, executing the steps R1 to R4 repeatedly. When, at step R3, the elapsed time (TP) since the timer (T) was set at the predetermined time (TS) has reached the set time (TS), the control means 600 determines that the document is the final document (step R5).

The image forming machine according to the present invention is constructed in the above-described manner, thus exhibiting the following actions and effects:

The image forming machine of the invention has the data switching controller for selecting data transferred from the host computer via the parallel data transfer-style interface, the data switching controller serving to transfer the copying machine control data to the control means of the copying machine, and directly send the print data to the control means of the printer. This obviates the need to provide the printer with a special device driver for data processing. Thus, the user can freely select a general-purpose printer. Furthermore, the data transmitted from the host computer is distinguished into the copying machine control code covering the predetermined number of bytes from the beginning of the data, and the succeeding print data for the printer. Thus, the data switching controller, which chooses between the copying machine control code and the print data, is simple-structured and inexpensive.

According to the image forming machine of the invention, moreover, the data transmitted from the host computer is distinguished into the copying machine control code covering the predetermined number of bytes from the beginning of the data, and the succeeding print data for the printer. Thus, the data switching controller, which chooses between the copying machine control code and the print data, may be a simple control device comprising a bidirectional data selector and a processing unit.

What I claim is:

1. An image forming machine comprising a host computer; a printer for printing the output of said host computer; a copying machine for making a predetermined number of copies of a document which is a printed sheet printed by said printer, said copying machine being equipped with an automatic document feeder; and a document supply device for conveying said document printed by said printer to said automatic document feeder, wherein

- a data switching controller connected to said host computer via a parallel data transfer type interface is provided for selectively transferring data transmitted from said host computer to control means provided in said printer, and to control means provided in said copying machine,
- said host computer sequentially produces a copying machine control code comprising an identification code covering a predetermined number of bytes, and control data with a predetermined number of bytes succeeding said identification code, and print data for said printer subsequent to said copying machine control code, and
- said data switching controller transfers said control data with the predetermined number of bytes, sent after said identification code by said host computer, to said control means of said copying machine, and transfers the subsequent print data to said control means of said printer.

2. The image forming machine of claim 1, wherein said data switching controller is composed of a bidirectional data selector for switching the parallel data transfer type interface side to the control means side of said copying machine or the control means side of said printer, and a processing unit for switch-controlling said bidirectional data selector according to the number of bytes of the data transmitted from said host computer.

* * * * *